United States Patent [19]
Heierli et al.

[11] Patent Number: 5,844,519
[45] Date of Patent: Dec. 1, 1998

[54] WATCHING APPARATUS BY MEANS OF A RADAR PROBE

[75] Inventors: Jakob Heierli, Reute; Alex Mauerhofer, Vilters, both of Switzerland

[73] Assignee: Geberit Technik AG, Jona, Switzerland

[21] Appl. No.: 761,304

[22] Filed: Dec. 6, 1996

[30] Foreign Application Priority Data

Dec. 6, 1995 [CH] Switzerland .............................. 3445/95

[51] Int. Cl.⁶ .......................... G01S 13/56; G01S 13/62
[52] U.S. Cl. ................................ 342/28; 342/61; 342/114
[58] Field of Search ................... 342/27, 28, 61, 342/84, 85, 103, 114, 174, 203

[56] References Cited

U.S. PATENT DOCUMENTS

| | | | |
|---|---|---|---|
| 3,568,188 | 3/1971 | Fishbein | 342/109 |
| 4,308,535 | 12/1981 | Guillerot et al. | 342/194 |
| 4,315,260 | 2/1982 | Kupfer | 342/86 |
| 5,130,717 | 7/1992 | Ewen et al. | 342/375 |
| 5,162,862 | 11/1992 | Bartram et al. | 356/6 |
| 5,311,190 | 5/1994 | Devendorf et al. | 342/157 |
| 5,512,834 | 4/1996 | McEwan | 324/642 |
| 5,519,400 | 5/1996 | McEwan | 342/28 |
| 5,521,600 | 5/1996 | McEwan | 342/27 |
| 5,543,799 | 8/1996 | Heger | 342/85 |
| 5,668,366 | 9/1997 | Mauerhofer | 250/221 |
| 5,682,164 | 10/1997 | McEwan | 342/27 |

*Primary Examiner*—John B. Sotomayor
*Attorney, Agent, or Firm*—McGlew and Tuttle

[57] ABSTRACT

The watching apparatus is provided with a radar probe, and is made such as to detect the presence of human beings. The radar probe includes a command unit and a branching element, inserted between an oscillator circuit and a transmitter stage, as well as a superposing circuit (5), in which a signal, derived from the radar transmitter, is superposed with an echo signal received by a receiver stage. The radar probe is made such as to work as an interference radar, and a delay circuit is inserted into the transmitter-receiver path between the branching element and the superposing circuit in order to increase the travelling time of the radar signal with respect to the branched off signal.

13 Claims, 2 Drawing Sheets

WATCHING APPARATUS BY MEANS OF A RADAR PROBE

FIELD OF THE INVENTION

The present invention concerns a watching device having a radar probe, with a control unit and branching element inserted between an oscillating circuit and a transmitter stage. A superposing circuit combines a signal from the branching element with an echo signal received by a radar receiver.

BACKGROUND OF THE INVENTION

From DE-A1-32 10 985, for example, a contact-free electronic command for a sanitary armature is known, which works with radar waves and uses the Doppler effect, such as to be able to watch the movements of persons in an as well direction-recognizing way. On high demands with respect to rinsing comfort and reliable operation of sanitary armatures, these radar probes are often not satisfactory, because they are unable to produce an unambiguous signal for the presence of a user of the corresponding sanitary armature. Also disadvantageous is furthermore the fact that such radar probes need to be adapted in a technically demanding way to the transmission and reflection properties of the corresponding sanitary armature. This exceeds in many cases the specific knowledge and the capacities of the sanitary craftsmen charged with the installation.

From U.S. Pat. No. 5,268,692, for example, a short-range distance meter for watching purposes in vehicles, working with an FM/CW-radar, is known. Such radar systems have often the disadvantage, that they need to work with relatively large frequency variations, which may under some circumstances go beyond the admissible band width of the radar emission.

SUMMARY AND OBJECTS OF THE INVENTION

It is therefore the task of the present invention to provide for a watching apparatus by means of a radar probe, which does not go beyond the admissible band width of the radar emission.

According to the invention, this task is accomplished by a watching apparatus by means of a radar probe where the radar probe is formed to operate as an interference radar, and where a delay circuit is inserted into a transmitter-receiver pad between the branching element 4 and the superposing circuit 5 in order to increase the travelling time of the radar signal with respect to the branched off signal.

The watching apparatus according to the invention proves to be advantageous not only in view of the admissible band width, but also because it is, in contrast to the FM/CW-radar systems, especially cost-effective.

An additional advantage of the watching apparatus according to the invention consists in the fact, that, for example, it assures a high rinsing comfort in sanitary applications, while it can be fit without any adaptation to all commercially available sanitary armatures.

Advantageous embodiments of the invention are indicated in the dependent patent claims.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
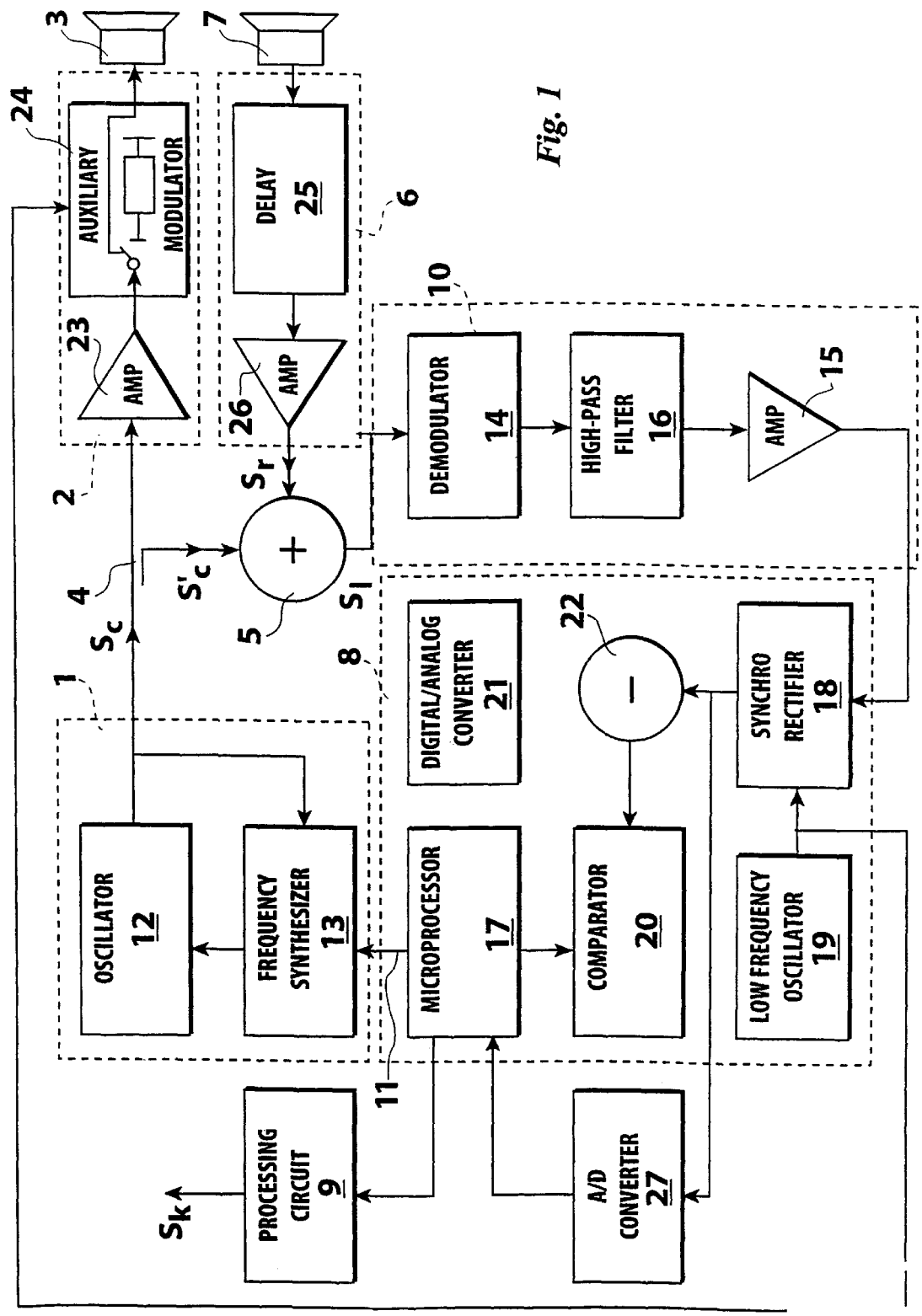
FIG. 1 is shows a block-diagram of a watching apparatus by means of a radar probe according to the invention.

The radar probe depicted in FIG. 1 comprises an oscillator circuit 1, the output of which is connected on one side over an transmitter stage 2 to a transmitter antenna 3, and on the other side over a branching element 4 to the first input of a superposing circuit 5. The receiver part of the radar probe comprises a receiver stage 6, connected to the second input of the superposing circuit 5, and a receiver antenna 7 connected to the receiver stage.

The watching apparatus comprises further a control unit 8 and a processing circuit 9, which can work analogously to that described in patent CH-03 784/94-3. A demodulator circuit 10 is inserted between the output of circuit 5 and the input of control unit 8. Control unit 8 is connected via a signal bus 11 to circuit 1.

Circuit 1 comprises a voltage controlled oscillator 12, delivering an oscillating signal Sc, which is tuned by a frequency synthesizer 13 to either a stepwise or iteratively variable frequency fm. The demodulator circuit 10 comprises preferably a demodulator 14 and a following amplifier 15. Preferably, a high-pass filter 16, which can, for example, consist of a coupling capacitor, is inserted between demodulator 14 and amplifier 15. The control unit 8 is fitted with a microprocessor 17, to which the processing circuit 9 and the signal bus 11 are connected.

In a first, preferred embodiment of the invention, the control unit 8 comprises further a synchronous rectifier 18, the inputs of which are connected on one side to the output of demodulator circuit 10 and on the other side to the output of a low-frequency oscillator 19. The output of the synchronous rectifier 18 is connected to an input of microprocessor 17 via a comparator 20.

In a second embodiment, the control unit 8 comprises a digital-analog converter 21, connected to the microprocessor 17, as well as a subtracting unit 22, which is inserted between the synchronous rectifier 18 and the comparator 20; these components are especially foreseen in order to permit a suppression of background signals. For certain applications, especially without background suppression, a simple connection can be present, however, between the output of the synchronous rectifier 18 and the input of the comparator 20.

The transmitter stage 2 comprises preferably an amplifier 23, which could as well be an isolator, and a following auxiliary modulator 24, which could as well have a simple commutator function, in order to support either the transmission path, or to conduct the signal towards a dummy load. The auxiliary modulator 24 can, for example, be a PIN-diode modulator. Instead of the auxiliary modulator 24, the signal of the LF-oscillator 19 could as well switch on and off, via a switch, the power supply of amplifier 23. The receiver stage 6 comprises, for example, a series connection of a delay circuit 25 and an amplifier 26. The delay circuit is principally located in the transmitter-receiver path; it can therefore, in its case, precede or follow the modulator 24, or be located partly in the transmitter stage 2 and partly in the receiver stage 6.

The radar probe according to FIG. 1 works as follows: The radar transmitter produces a signal $$Sc = a \cdot \sin(w \cdot t)$$

A receiver signal Sr arrives at the superposing circuit 5, with a time lag Td+2r/c, where Td is the delay time caused by the delay circuit 25, 2r the distance to the target and back, and c the speed of light. For the signal Sr holds therefore:

$$Sr = b \cdot \sin(w \cdot (t - Td - 2r/c))$$

Because the sinusoidal signals Sc and Sr at the two inputs of the superposing circuit 5 do both have the same frequency, their superposition yields as well a sinusoidal function in time, whereby, taken as a mean over time, the signal amplitudes add at some places, whilst they cancel partially at other places, such that normally an in itself irrelevant DC-component is present.

At the output of demodulator 14, a sequence of amplitudes is therefore obtained, the periodicity $\Delta fm$ of which represents a measure of the target distance r. The periodicity of the interference signal, that means, the frequency $\Delta fm$, with which a given amplitude repeats itself, is obtained from:

$$\Delta w \cdot t - 2 \cdot \pi \cdot n = \Delta w \cdot (t - Td - 2r/c)$$

where n is an integer, taking into account that $$\Delta w = 2 \cdot \pi \cdot \Delta fm$$

From this formula, the radar formula is obtained for n=1, as follows:

$$r = c \cdot (1 - \Delta fm \cdot Td)/(2 \cdot \Delta fm)$$

or, for Td=10 ns:

$$r[cm] = 150 \cdot ((100/\Delta fm \, [MHz]) - 1)$$

Remarkable at this formula for the near-distance radar is the fact, that the distance measurement is independent of the absolute radar frequency; the only importance is the change $\Delta fm$ of the carrier frequency fm. By means of the delay time Td, a given radar bandwidth can be adapted to the desired target distance range. With a delay time Td of, e.g., 10 ns and a measured periodicity of the interference amplitude of $\Delta fm = 66.66$ MHz, a distance r=75 cm is obtained from the radar formula.

An advantage of the watching apparatus according to the invention consists therefore in the fact, that, at short target distances, the frequency variations corresponding to the periodicity of the interference amplitude do not adopt such large values as would lead to a trespassing of the permissible band width of the radar emission. If, namely, for a given value of Td a frequency change $\Delta fm$ is required for the determination of a distance r, for which at Td=0 a frequency change $\Delta fm'$ would be necessary, the relationship $$\Delta fm = \Delta fm'/(1 + \Delta fm' \cdot Td)$$

or:

$$\Delta fm = \Delta fm'/2 \text{ for } \Delta fm' \cdot Td = 1$$

holds.

This shows, that the necessary bandwidth is reduced to about the half, if a delay circuit is used.

According to a first embodiment of the invention without the elements 24, 16, 18, 19, 21, and 22, the output of amplifier 15 is directly connected to the comparator 20.

The task of the microprocessor in all embodiments consists in the determination of the frequency difference $\Delta fm$, at which a given amplitude repeats itself. To this aim, the microprocessor 17, which is connected to the radar transmitter 1, is programmed in such a way as to change the carrier frequency fm stepwise or iteratively from a given starting value fm1 (FIG. 4), until it reaches a value fm2, at which a phase shift of the interference signal of at least approximately $2 \cdot \pi$ is obtained with respect to the starting value at fm1. At this point, $\Delta fm = fm2 - fm1$ holds, and the radar formula can be applied to determine the distance r; this is possible because the constant c and the fixed parameter Td are known. This all is automatically controlled by the microprocessor 17, which furnishes in each case a suitable code signal to the frequency synthesizer 13, in order to command oscillator 12 with the desired frequency fm1, etc., and this, for example, using a sweep-control in quartz-precise 500 kHz steps, which additionally saves an otherwise necessary frequency measuring unit.

To this aim, the microprocessor receives, after each step of the method, information on if the corresponding value of the amplitude is larger or smaller than a given reference signal. This information is furnished by the comparator 20. The processing circuit 9 finally receives from the microprocessor 17 information about the distance r between the radar probe and a target.

The technical realization of the interference based near-distance radar is therefore relatively simple, because it works in a purely static way. The frequency synthesizer is within large limits programmable via the software of the microprocessor 17, and can preferably have the following technical data:

Radar frequency: about 1 to 40 GHz

Band width: 10 MHz to 3 GHz

Step width: $10 \cdot n$ kHz with, for example, 240 steps and n=50 (distance resolution±1 cm). Hereby it has to be noted that in praxis, one is allowed to work only with one of the officially admitted frequencies (2.4 GHz; 5.8 GHz; 9.6 Ghz; 10.5 Ghz; 13.7 GHz; 24.1 Ghz; 34,7 GHz).

The iteration method with a frequency synthesizer, according to the invention, offers large flexibility in the determination of the period width of the interference signal, especially when using a linear sweep-control over all of the 240 steps upwards or downwards the whole bandwidth. For the programming of the synthesizer and the measurement of the interference signal, modulated in its case via the auxiliary modulator 24, a total time of maximal 1 ms/step, and therefore a total sweep duration of maximal 240 ms, are needed.

Because each of the 240 tunable frequencies can be reached by the synthesizer and measured in maximal 1 ms with quartz-precision, simple and rapid delimitating methods for the determination of the period width of the interference signal are additionally realizable.

According to the second embodiment of the invention, in which are present as well the elements 19, 18, 16, and 24, the output of the synchronous rectifier 18 is directly connected to the input of the comparator 20. This embodiment is provided to enhance the measurement precision, in view of the above-mentioned DC-component.

The resulting problem is namely, to process a very small radar signal which is superposed with a comparatively very big reference signal. According to experience in praxis, this is connected with some difficulties, which are circumvented in an excellent way with the second embodiment according to the invention.

According to this second embodiment, the low-frequency oscillator 19 delivers a modulation signal with a frequency of, for example, 10 kHz, such that for arbitrary radar frequencies a simple rectification of the amplitudes of the interference signal is performed in the synchronous rectifier 18. In this way, the periodicity of the interference signal is not perturbed, because the rectified value changes even in this case periodically with the frequency Δfm.

Figure 2:
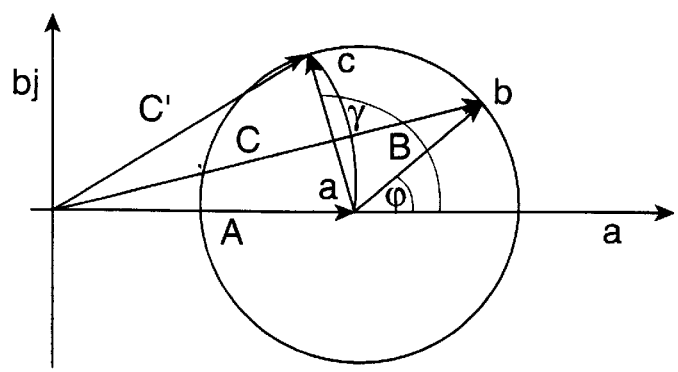
FIG. 2 is a phasor diagram explaining the functioning of a preferred embodiment of the watching apparatus according to the invention.

In the phasor diagram according to FIG. 2, vector A represents the reference signal S'c, which has not yet been modulated by the modulator 24, and vector B represents the receiver signal Sr, which has already been modulated by the modulator 24, and which shows an object distance dependent phase angle φ with respect to vector A. The superposition yields vector C as the interference signal Si. On switching on and off the commutator 24, corresponding to a near 100% square modulation of vector B, the interference vector C jumps forth and back between the points b and a, in cadence with the modulation frequency of the low frequency oscillator 19. Its length is varying therefore between the length of vector C and that of vector A. At a phase angle φ=γ, at which the lengths of vectors A and C' are equal, the modulation upon switching on and off disappears. If the phase angle φ is smaller or greater than γ, the modulation on the interference vector reappears; however, the modulation phase changes by 2·π at this zero point. The phase change of 180° around the zero point of the modulation voltage is exploited by the synchronous rectifier 18 in the signal processing, which serves for the determination of the period width Δfm of the interference signal through phase-synchronous rectification according to the invention.

The interference signal, which is obtained by superposition of radar and reference signal, contains therefore, in addition to the DC-component stemming from the reference signal, a square-modulated AC-component, originating from the radar echo. By means of the simple high-pass filter 16, contained in the demodulator circuit 10, the modulated radar echo is separated from the DC-component for further processing. The zeros of the interference signal (FIG. 4) are determined by the comparator 20 after the phase-synchronous rectification.

For the generation of the interference signal Si, according to this second embodiment, the radar signal, characterized by a large dynamic range, is superposed with a constant reference signal S'c, derived from the transmitter signal, and subsequently rectified. The amplitude of the interference signal to be processed describes, over the measurement range, an approximately sinusoidal curve which is superposed to a constant amplitude value. This constant amplitude value corresponds to the amplitude of the reference signal S'c, and is conveniently used as the baseline for the precise determination of the period width of the interference signal, because the intersection angle of the interference signal with this baseline is the largest possible. In this case, the comparator can therefore be a so-called zero-detector.

According to the third embodiment of the invention, a background signal suppression is foreseen, which is realized by the means of the digital/analog converter 21 and the subtracting unit 22.

A background echo, which is superposed to the target echo, is produced by reflection at objects which are permanently present within the detection range of the radar, specifically by the sanitary armature itself. Because the interference radar method is not able to process several targets at the same time, this background echo may result in inadmissible measurement errors.

To avoid these measurement errors, the method to suppress background according to the invention is employed: By means of a reference measurement without target echo, the background echo over the whole measurement frequency range is determined and stored in the microprocessor 17. At each target distance measurement, the stored background echo for the corresponding measurement frequency is subsequently "compensated away". This method presupposes, however, that background and target echoes are considerably smaller than the reference signal S'c.

The modulation used for phase-synchronous rectification is as well beneficial for background suppression. This modulation consists, as explained above, in the fact that the output signal Sc of the VCO-oscillator 12 of the radar transmitter 1 is to 100% amplitude modulated with the mentioned modulation signal of, e.g., 10 kHz, before its emission over the transmitter antenna, whereas in the reference signal path, however, no amplitude modulation is performed. The compensation of background echoes can therefore be integrated in a very simple way into the circuit of this phase-synchronous rectifier, and this equally by means of comparator 20, whose logical output signal furnishes to the microprocessor 17 the direct information on if the target echo at the given measurement frequency has been attenuated or amplified by the interference, after that, for each target distance measurement, the stored background echo for the corresponding measurement frequency has been "compensated away".

Figure 3:
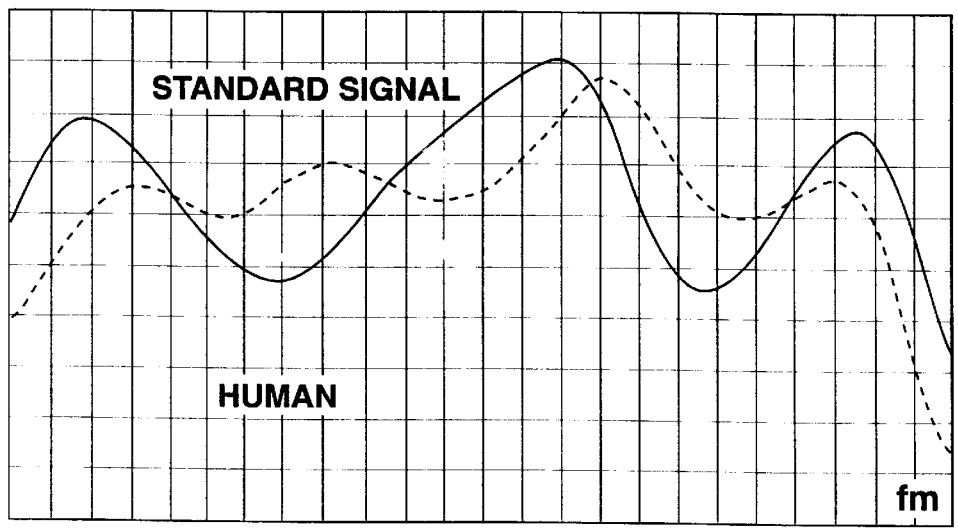
FIG. 3 is a diagram explaining the functioning of a further embodiment of the invention with background suppression.
Figure 4:
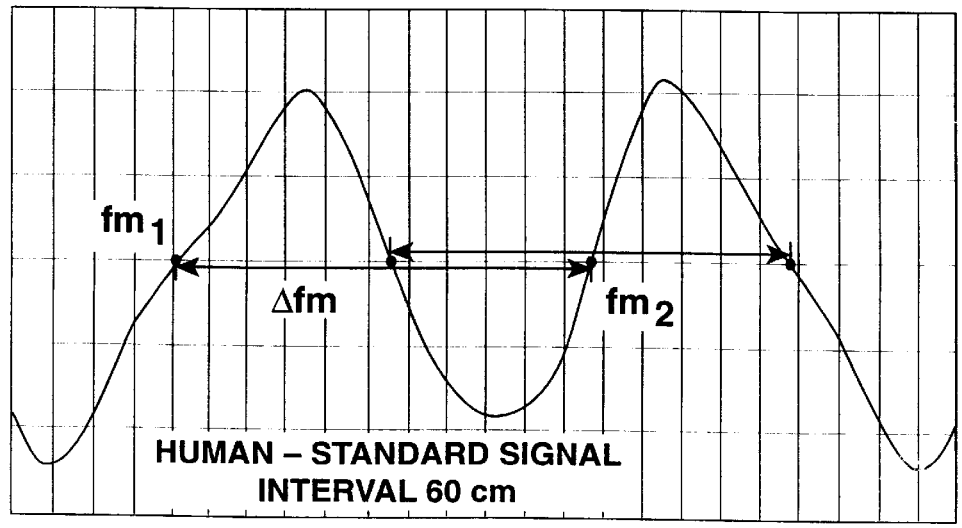
FIG. 4 is a diagram used to represent the frequency of repetition of a predetermined amplitude of the interference signal.

The background echo can be recorded in the absence of foreign bodies in the watching area. For this recording, an analog/digital converter 27 is inserted between the output of the phase-synchronous rectifier 18 and an input of the microprocessor 17. The near-distance radar seizes the background echo, as if it were a target echo, and the microprocessor 17 determines the interference amplitude values, depicted as a punctuated line in FIG. 3. The full line in FIG. 3 represents the interference amplitude values, which are obtained if a human being is additionally present. FIG. 4 depicts the resulting amplitudes, after application of the method for background suppression according to the invention.

The difference Δfm=fm1−fm2 of the frequencies fm1 and fm2 of two signals, which show increasing slopes in the region after two subsequent zeros, yields the required periodicity Δfm of the interference signal, that means, the value, which has to be inserted into the radar formula in order to determine the distance r.

In another variant without the elements 21 and 22, an A/D-converter can be inserted in place of the comparator 20, whereby in this case the microprocessor is programmed to subtract the corresponding values of the background echo from the interference amplitude values of the human.

The processing circuit 9, or, in its case, the microprocessor 17, can be made such as to furnish at least one criterium signal Sk, if the value of the instantaneous distance r between a person in the watching area and the radar probe is smaller than a predetermined reference value dr; and the watching apparatus can additionally comprise a command unit, made such as to produce an utility signal depending upon this criterium signal Sk.

This command unit can furthermore be made such as to switch the radar probe over, upon presence of the criterium signal Sk, from a passive watching state with a first repetition frequency fw1 to an active watching state with a second repetition frequency fw2, which is higher than the first one, or in which the radar probe is continuously switched on, where preferably the first repetition frequency fw1 lies in the range of 0.1 Hz to 100 Hz, and the second repetition frequency fw2 in the range of 10 Hz up to continuous operation of the radar probe. Preferably, the command unit and the watching apparatus are connected to each other by electrical wires, whereby the command unit controls the watching apparatus in such a way, that the latter is powered only, for example from a battery, during time intervals which are short compared to the period of the repetition frequency fw1; fw2.

The watching apparatus can as well be made such as to process several criterium signals, containing information about targets at several distances and/or occurring radial target velocities and/or the direction of movement at a seized radial target velocity.

The antennas 3, 7 can be horn antennas or planar antennas disposed on a printed circuit board.

The apparatus according to the invention can not only be applied in an excellent way for sanitary armatures, but, for example, also for door openers or other equipment relying on near-range detection of living beings.

We claim:

1. A watching device for contact-less control of a plumbing unit having a radar probe, the device comprising:
   an actuating circuit connected to the plumbing unit;
   an oscillator circuit generating an oscillating signal;
   a branching element receiving said oscillating signal from said oscillating circuit, said branching element dividing said oscillating signal into a transmitting signal and a reference signal;
   a radar transmitter receiving said transmitting signal from said branching element and emitting a radar wave;
   a radar receiver receiving said radar wave and generating a receiver signal;
   a superposing circuit combing said reference signal and said receiver signal to form an interference signal;
   a delay circuit positioned in a path of said radar transmitter and receiver, and said delay circuit being positioned between said branching element and said superposing circuit for increasing a travel time along said path of said radar transmitter and receiver with respect to said reference signal;
   a control unit for receiving said interference signal, and controlling said oscillator circuit to operate the radar probe as an interference radar to determine if an object is within an area of surveillance and said control unit generating an actuating signal applied to said actuation circuit.

2. Device according to claim 1, wherein:
   said delay circuit has a delay time between 2 and 40 ns.

3. A device in accordance with claim 2, wherein:
   a demodulator circuit is positioned between said superposing circuit and said control unit.

4. Device according to claim 3, wherein:
   said control unit comprises a rectifier, connected at its input to an output of said demodulator circuit, said rectifier is connected via a comparator to a microprocessor which is connected to and controls the oscillator circuit.

5. Device according to claim 4, wherein:
   said demodulator circuit comprises a demodulator and a following highpass filter; said control unit comprises a low frequency oscillator, an output of said low frequency oscillator is connected to an input of the rectifier and to an input of the radar transmitter to form an auxiliary modulator.

6. Device according to claim 4 wherein:
   said control unit includes a subtracting unit, inserted between the rectifier and the comparator and that a second input of the subtracting unit is connected via a digital/analog converter to the microprocessor, said subtracting unit suppressing background signals.

7. Device according to claim 6, wherein:
   an analog/digital converter is inserted between the output of the rectifier and another input of the microprocessor for storing background signals.

8. Device according to claim 5, wherein:
   said control unit includes, a subtracting unit, inserted between the rectifier and the comparator and that a second input of the subtracting unit is connected via a digital/analog converter to the microprocessor, said subtracting unit suppressing background signals.

9. A device in accordance with claim 2, wherein:
   said radar receiver includes a receiver antenna;
   said delay circuit is positioned in said radar receiver between said receiver antenna and said suppressing circuit.

10. Device according to claim 1, wherein:
    said oscillator circuit comprises a frequency synthesizer, which is tunable to a variable frequency (fm) by the control unit, a voltage controlled oscillator is connected to an output of said frequency synthesizer.

11. Device according to claim 10, wherein:
    said frequency synthesizer is made such as to work with one of a plurality of official frequencies, with a band width of 120 MHz and a step width of 50·n kHz, where n is an integer between 4 and 20.

12. A device in accordance with claim 1, wherein:
    a demodulator circuit is positioned between said superposing circuit and said control unit.

13. A device in accordance with claim 1, wherein:
    said delay circuit increases an overall travel time of said transmitting and receiving signal along said path.

* * * * *